April 19, 1955     W. J. METZGER     2,706,440
HILLER ATTACHMENT
Filed Sept. 21, 1953     2 Sheets-Sheet 1
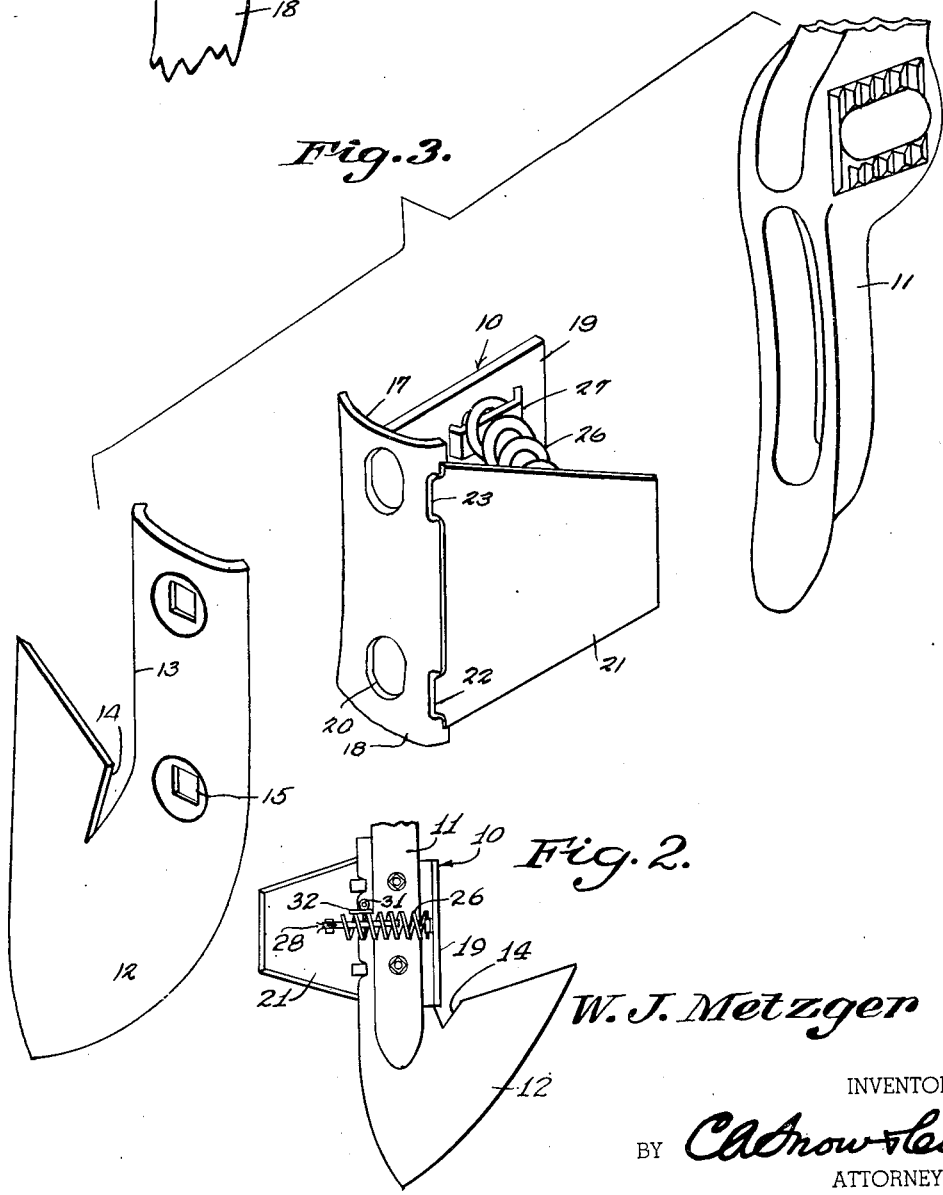
W. J. Metzger
INVENTOR April 19, 1955　　　W. J. METZGER　　　2,706,440
HILLER ATTACHMENT Filed Sept. 21, 1953　　　2 Sheets-Sheet 2

W. J. Metzger
INVENTOR
BY CA Snow & Co.
ATTORNEYS.

United States Patent Office 2,706,440
Patented Apr. 19, 1955

2,706,440

HILLER ATTACHMENT

Walter J. Metzger, Saginaw, Mich.

Application September 21, 1953, Serial No. 381,178

2 Claims. (Cl. 97—205)

This invention relates to a hiller attachment for cultivators.

It is a principal object of this invention to provide a hiller attachment of the kind to be more particularly described hereinafter for a cultivator shovel for throwing earth to a plant and for covering small weeds or the like.

Another object of this invention is to provide a hiller attachment for cultivators having a spring pressed hiller attachment for attachment to a cultivator for moving earth to enclose a plant whereby the hiller attachment is hingedly adjustable outwardly of the cultivator and may yield from an initially set position upon contact of the cultivator with a stone or some other solid object.

Still another object of this invention is to provide a hiller attachment for a cultivator which is easily formed to the desired shape and at an economical cost and may be attached to a cultivator with inexpensive equipment and tools generally found on farms or in farm machine shops.

A further object of this invention is to provide a hiller attachment of a kind which may be secured to a cultivator at the beginning of a cultivating season and remain attached during the entire season for use as a cultivator.

Other and further objects and advantages of the invention will be hereinafter described and the novel features thereof defined in the appended claims.

In the drawings:

Figure 1 is a front elevation, partly broken away, of a hiller attachment constructed according to an embodiment of my invention.

Fig. 2 is a rear elevation thereof.

Fig. 3 is a perspective view, partly broken away, of the cultivator shovel, cultivator supporting leg, and the hiller attachment of this invention in disconnected relation of its related elements.

Fig. 4 is a fragmentary enlarged view, partly broken away, of a portion of the hiller attachment.

Figure 5:
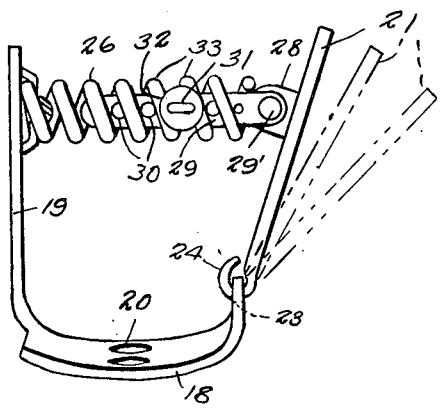
Fig. 5 is a top plan view of the hiller attachment constructed according to an embodiment of my invention.
Figure 8:
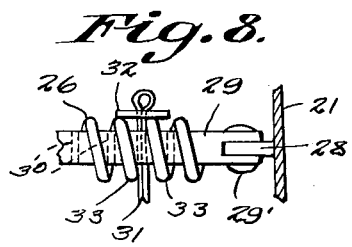
Fig. 8 is a fragmentary detailed section, partly broken away, of the hinged plate and the resilient actuating means therefor of my invention.
Figure 6:
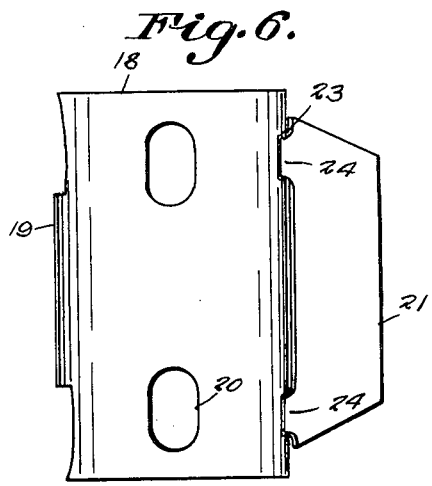
Fig. 6 is a front elevation.
Figure 7:
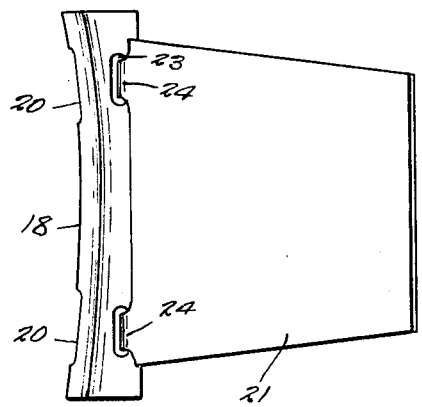
Fig. 7 is a side elevation.

In the practice of maintaining a farm it is customary to plow the ground of the farm and then to plant seeds for plants and to cultivate the plowed earth with a cultivator best attached to a power device ordinarily used on the farm. For cultivating the soil the loose soil on the surface of the earth may best be moved from one position to another to cover the surface just plowed and to cover weeds and other undesirable growths adjacent to the furrows which have just been plowed. For moving the earth from the edges of the furrows a spreader attachment is connected to a cultivator and the spreader attachment includes an outwardly extending plate for moving the loose earth from the just plowed furrow onto the earth adjacent the furrow.

The cultivator spreader attachment, constructed according to an embodiment of my invention, is shown in the drawings and is provided with a yielding arm for engaging the loose earth in the process of moving the loose earth to form a row adjacent to a plowed furrow as desired. The cultivator spreader attachment 10 is secured to a cultivator supporting leg of a commonly used cultivator having a power moving means, not shown in the drawings, and the plate of the cultivator attachment is yieldably supported for yielding upon engagement of the cultivator spreader with a stone or other hard surface of the earth.

The cultivators, commonly in use today, include a cultivator blade 12 for engagement with the surface of the earth as the cultivator blade 12 has an upwardly extending cultivator blade shank 13 for connection to the supporting leg 11. The cultivator blade 12 is split along the upper edge thereof to provide a pair of adjacent cultivator blade sections separated by the split 14 and the cultivator blade is adapted to be moved in a direction longitudinally of the direction of movement of the cultivator.

The cultivator blade shank is provided with a plurality of longitudinally spaced apart openings 15 for the reception of attaching screws or bolts for attaching the cultivator blade to the supporting leg. Ordinarily, the cultivator blade is secured to the supporting leg by stove bolts engaging through openings 15 of the cultivator blade and the cultivator supporting leg.

The cultivator spreader attachment constructed according to an embodiment of this invention is to be secured on the cultivator between the cultivator blade and the supporting leg and has a portion extending outwardly of the cultivator blade for engagaing the loosened earth adjacent to a plowed furrow for moving the loose earth transversely of the furrow onto the planted seeds or onto the undesirable growths adjacent to the furrow.

The cultivator spreader attachment is provided with a bracket 17 for attachment on the rear side of the cultivator blade 12 between the cultivator blade and the supporting leg 11 and the bracket 17 is made of suitable metal bent to the shape described herein. An arcuate bracket plate 18 is formed on the forward edge of the bracket 17 for engagement about the supporting leg 11 and for engagement with the rear surface of the cultivator blade shank and a fixed plate 19 is secured to the forward arcuate plate 18 along the forward edge thereof and extends rearwardly of the bracket arcuate plate. Openings 20 are formed in the arcuate plate 18 through which the same bolts used for securing the cultivator blade to the supporting leg may be extended. The fixed plate 19 extends rearwardly from the forward arcuate bracket plate 17 longitudinally of the direction of movement of the cultivator on the earth.

A hinged plate 21 is pivotally mounted on the other vertically extending edge of the arcuate plate 18 and is spaced apart from the fixed plate 19. The hinged plate 21 is hingedly connected to the arcuate bracket plate 18 by a hinge 22 and the hinge 22 is formed by openings 23 along the edge of the bracket plate 18 through which hinge arms 24 are extended for rotary movement of the hinged plate 21 about a vertically extending axis perpendicular to the direction of movement of the cultivator.

For moving the hinged plate 21 transversely of the cultivator, a spring 26 is positioned between the fixed plate 19 and the hinged plate 21. The spring 26 is a coil spring and one end of the spring 26 is engaged in a fixed leaf 27 secured on the fixed plate 19 on the side thereof facing the hinged plate 21. The other end of the spring 26 is connected to the hinged plate 21 for urging the hinged plate away from the fixed plate 19 about the hinge 22.

A lug 28 is fixed on the hinged plate 21 on the side thereof facing the fixed plate 19 and intermediate the length of the hinged plate and an arm 29 is pivotally connected on the lug 28 by a hinge pin 29' for movement of the arm 29 about a vertical axis.

The arm 29 is provided with a plurality of adjacent openings 30 along the length thereof through which a cotter key 31 may be extended for initially positioning the hinged plate 21 relative to the fixed plate 19. The cotter key 31 engages the sides of the coils 33 of the spring 26 and a washer 32 is placed on the upper end of the cotter key for holding the cotter key against downward sliding movement in a selected one of the openings 30.

In the use and operation of the cultivator spreader attachment 10, the cultivator blade 12 is removed from the cultivator supporting leg 11 and upon reassembly of the cultivator blade the spreader attachment 10 is inserted between the shank of the cultivator blade and the supporting leg at which time the attaching bolts for the cultivator are inserted in the openings of the cultivator shank and through the openings of the spreader attachment. The hinged spreader plate 21 is placed in a selected position by inserting the cotter key 31 through a selected one of the openings in the arm 29 so that the hinged plate 21 may extend transversely of the cultivator to a desired angle and still be yieldable upon contact of the cultivator spreader blade with a stone or a solid piece of earth.

When the spreader attachment 10 has been secured on the cultivator supporting leg, the hinged plate may be moved at any time by further adjusting the angle of the hinged plate 21 to the supporting leg. As the spreader attachment is yieldable the spreader attachment need not be removed from time to time during the cultivator season as it may be left in its desired operative position on the cultivator and the cultivator supporting leg 11.

While the specifice details of one embodiment of this invention have been herein shown and described, the invention is not confined thereto as changes and alterations may be made without departing from the spirit and scope thereof as defined in the appended claims.

I claim:

1. A spreader attachment for a cultivator having a cultivator blade, an upstanding shank on said blade and a cultivator supporting leg, comprising a cross sectionally arcuate bracket plate engageable between said shank and said supporting leg, bolt means extending through said shank, said arcuate bracket plate and said cultivator supporting leg, a fixed plate secured on one end thereof to one side of said arcuate bracket plate and extending rearwardly therefrom, a spreader plate hingedly mounted on the other side edge of said arcuate bracket plate for swinging horizontally of said supporting leg about a vertical axis, a lug fixed on said hinged spreader plate on the side of said spreader plate towards said fixed plate, an arm hinged on said lug for swinging movement about a vertical axis, and a coil spring coiled about said arm and engaging said fixed plate at one end thereof and said spreader plate at the other end for urging said spreader plate outwardly of said fixed plate and said spreader supporting leg.

2. A spreader attachment for a cultivator as defined in claim 1 including spaced apart adjacent bores through said arm and a cotter key engaging through a selected one of said bores bearing against a loop of said coiled spring for securing said spreader plate at a selected angle to said fixed plate and said supporting leg.

References Cited in the file of this patent

UNITED STATES PATENTS

| | | |
|---|---|---|
| 487,749 | Kea | Dec. 13, 1892 |
| 983,629 | Lundell | Feb. 7, 1911 |
| 1,143,591 | Bergstrom | June 15, 1915 |
| 1,343,564 | Hoynack | June 15, 1920 |
| 1,506,993 | Okamoto | Sept. 2, 1924 |
| 2,547,680 | Wright | Apr. 3, 1951 |
| 2,643,470 | Kaeser | June 30, 1953 |